(12) United States Patent
Erb et al.

(10) Patent No.: US 8,471,192 B2
(45) Date of Patent: Jun. 25, 2013

(54) SAFETY SCANNER TRACKING DANGEROUS OBJECTS AND DYNAMICALLY SWITCHING PROTECTED FIELD CONFIGURATION

(75) Inventors: Frank Erb, Denzlingern (DE); Daniel Wagner, Pfaffenweiler (DE)

(73) Assignee: Sick AG, Waldkirch (DE)

( * ) Notice: Subject to any disclaimer, the term of this patent is extended or adjusted under 35 U.S.C. 154(b) by 336 days.

(21) Appl. No.: 12/909,247

(22) Filed: Oct. 21, 2010

(65) Prior Publication Data
US 2011/0095170 A1    Apr. 28, 2011

(30) Foreign Application Priority Data
Oct. 22, 2009  (EP) ..................................... 09173842

(51) Int. Cl.
    *G06M 7/00*  (2006.01)
(52) U.S. Cl.
    USPC ........................................................ 250/221
(58) Field of Classification Search
    USPC .......................... 250/221; 340/540, 541, 552
    See application file for complete search history.

(56) References Cited

FOREIGN PATENT DOCUMENTS

| DE | 42 15 327 C2 | 11/1993 |
| DE | 44 11 448 A1 | 10/1995 |
| DE | 10 2007 007 576 A1 | 8/2008 |
| DE | 102007007576 A1 * | 8/2008 |
| EP | 1443 343 A2 | 8/2004 |

* cited by examiner

*Primary Examiner* — Thanh Luu
*Assistant Examiner* — Renee Naphas
(74) *Attorney, Agent, or Firm* — Nath, Goldberg & Meyer; Jerald L. Meyer (57) ABSTRACT

A safety scanner (10) is set forth for securing a monitored zone (18), wherein the safety scanner (10) has a light transmitter (12) for transmitting a light beam (14), a deflection unit (16) for the periodic deflection of the light beam (14) into the monitored zone (18), a light receiver (24) for generating received signals from the light beam (20) remitted by objects in the monitored zone (18) as well as an evaluation unit (30) which is made to recognize intrusions into a protected field within the monitored zone (18) with reference to the received signals and thereupon to provide a securing signal, except for the case that the intrusion can be associated with an expected dangerous object (40). In this respect, the evaluation unit (30) is made to track the dangerous object (40) in the protected field and to carry out the association of intrusions with the expected dangerous object (40) with reference to the contour and to the then current position, orientation and/or speed of the dangerous object (40).

11 Claims, 5 Drawing Sheets

SAFETY SCANNER TRACKING DANGEROUS OBJECTS AND DYNAMICALLY SWITCHING PROTECTED FIELD CONFIGURATION

The invention relates to a safety scanner and to a method for securing a monitored zone.

Laser safety scanners such as are known from DE 43 40 756 A1 are frequently used for monitoring work spaces. A light beam generated by a laser periodically sweeps over a monitored zone with the help of a deflection unit. The light is remitted at the objects in the monitored zone and is evaluated in the scanner. A conclusion is drawn from the angular position of the deflection unit on the angular position of the object from the time of flight of light while using the speed of light and additionally on the distance of the object from the laser scanner. In this respect, two general principles are known to determine the time of flight of light. In phase-based processes, the transmitted light is modulated and the phase shift of the received light with respect to the transmitted light is evaluated. In pulse-based processes, such as are preferably used in safety technology, the laser scanner measures the time of flight until a transmitted light pulse is received again.

With the angular data and the distance data, the location of an object in the monitored zone can be determined and thus two-dimensional protected fields can be defined within the monitored zone. If an object is located in a protected field, a corresponding warning signal or stop signal can be output by the evaluation unit of the scanner.

An important technical safety application is the securing of machines which form a source of danger. In this respect, the laser scanner monitors a protected field which may not be entered by an operator during the operation of the machine. If the laser scanner recognizes an unauthorized intrusion into the protected field, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the securing in good time and so the increase the availability of the plant.

Sensors used in safety technology have to work particularly reliably and must therefore satisfy high safety demands, for example the EN13849 standard for safety of machinery and the machinery standard EN1496 for electrosensitive protective equipment (ESPE). A number of measures have to be taken to satisfy these safety standards such as reliable electronic evaluation by redundant, diverse electronics, function monitoring or specifically monitoring the soiling of optical components, in particular of a front screen, and/or provision of individual test targets with defined degrees of reflection which have to be recognized at the corresponding scanning angles.

Cooperative workplaces are increasingly present in industrial production plants, for instance robot stations in which man and machine are active together. The demand on the technical safety monitoring is thereby increased because more and more areas arise in which man and machine are present together.

An example for a common area used by man and machine is formed by route crossings in the production plants of automotive manufacturers. Automobiles are moved, for example horizontally, on vertically adjustable platforms above a conveyor system at these crossings and operators, also in vehicles or fork-lift trucks, cross this danger zone in the vertical direction. There is therefore a risk that the conveyor system and the automatically moving platforms injure people.

A very simple securing, and one which is no longer allowed in practice, is formed by two traffic lights at both sides of the crossing path which prohibit the entering of the danger zone by a red light and accordingly allow the crossing on a green light. Mechanic barriers can also be provided in addition to the traffic lights. There is no emergency stop of the conveyor system or other additional safety measures in these cases.

In better secured applications, two laser scanners with switchable protected field configurations are used. For example, with a red light, one respective protected field is arranged before and after the crossing to monitor that no person enters the crossing despite the red light. On a green light, in contrast, the protected fields are positioned at the side to release the crossing, but simultaneously to prevent persons entering into the zone of the conveyor. The configuration of the protected fields requires a high configuration effort and test effort. In this respect, an additional sensor system and safety controls are moreover required to switch over the protected field configuration. A relatively large area is also required before the crossing for the warning and protected fields.

A safety scanner is known from DE 44 11 448 A1 which compares the distance contour of an object moving through with a reference contour in a perpendicular protected field at a door in order then to decide whether it is a permitted object which may pass the door or an unauthorized object which triggers an emergency stop. The distinction is in this respect solely based on the contour determined by means of a respective single scan and is thus only reliable and flexible with limitations.

It is therefore the object of the invention to improve the danger securing with a scanner for applications at cooperative workplaces.

This object is satisfied by a safety scanner and by a method for securing a monitored zone in accordance with the present disclosure.

In this respect, the invention starts from the basic idea of utilizing prior knowledge of expected protected field intrusions. If an intrusion can be associated with a known object, the safety function is suppressed. This object is called the dangerous object because it admittedly represents an allowed intrusion, but simultaneously a contact with operators has to be prevented, for example because the dangerous object is a robot arm, a tool or part of a conveyor system whose movement could injure operators. The invention, however, equally also includes objects from which no danger emanates. The dangerous object is tracked or recognized (object tracking, object recognition) as long as it is in the protected field. Only intrusions which cannot be traced back to the tracked or recognized dangerous object result in a safety-directed reaction, for example an emergency stop, triggered by the securing signal. The dangerous object is accordingly blocked out of the protected field for improved security at cooperative workplaces.

The invention has the advantage that no additional sensor system or control information is required. The safety scanner, depending on the shadowing in the application also a combination of a plurality of safety scanners, itself generates all the necessary information to adapt the protected field. The configuration and test effort in the application is substantially reduced. The safety scanner can also itself control traffic lights, barriers or similar systems and can forward their states to a higher-ranking process controller so that the corresponding control and sensor effort is dispensed with.

Due to the angular resolution and distance resolution, multipart two-dimensional protected fields of largely any desired shape can also be defined with a safety scanner. Nevertheless only one protected field is often uniformly spoken of. A similar substantial simplification applies to the dangerous object even though a plurality of dangerous objects are blocked out in a similar manner and also a whole library of possible dangerous objects can be provided.

The evaluation unit is preferably made to dynamically adapt the protected field during the movement of the dangerous object in the protected field, in particular such that the dangerous object is always surrounded in all directions by a protected field ensuring safety. This dynamic adaptation, on the one hand, includes the blocking out of the dangerous object. On the other hand, also in dependence on the state of the dangerous object, that is primarily on its position and speed, the protected field can also be changed in its shape and size in order still to prevent any contact between the operator and the danger source. In this respect, circumstances of the plant, for instance walls or other inaccessible zones, can also be dynamically taken into account. It is accordingly not necessary that the dangerous object is always completely surrounded by a protected field in all directions as long as open directions, not secured by a protected field, do not offer persons any intrusion possibilities.

The evaluation unit is preferably made to reduce the protected field dynamically in a counter-direction to the direction of movement of the dangerous object. Particularly with a known movement trajectory of the dangerous object, the securing is no longer necessary, or is only necessary with smaller safety distances, after its passing by movement. The secure rear crossing behind the dangerous object is, for example, made possible by corresponding dynamic adaptation of the protected field.

The evaluation unit is preferably made to switch over between a plurality of protected field configurations which each fix the boundaries of the protected field within the monitored zone. There are therefore, for example, a plurality of worksteps at the plant which each require different forms of securing. An ideal adaptation to these changing demands is made possible by the switchover of the protected field configuration.

The evaluation unit is particularly preferably made to carry out a switchover of the protected field configuration when the dangerous object enters into the protected field and/or exits the protected field, with the protected field configuration in particular being the same before the entry and after the exit of the dangerous object. An adapted protected field configuration is thus used during the object tracking or the object recognition of the dangerous object which only allows the dangerous object in a specific zone which can be freely accessible in the absence of the dangerous object.

The evaluation unit is preferably made to recognize the dangerous object in the protected field with reference to the contour and trajectory within the protected field and/or to the location of the penetration of exiting of the protected field. An object model is thus prepared with reference to advance knowledge of the dangerous object, said model substantially facilitating the object tracking or object recognition and setting very good starting hypotheses or starting conditions for the location of the dangerous object in the scanner data. The object tracking thus becomes simpler and more reliable.

The evaluation unit is advantageously made to provide at least one of the following part zones in the monitored zone:
a warning field which is situated before the protected field and in which a warning takes place first before a securing;
a free zone in which all intrusions are allowed; and/or
an entry zone and an exit zone in which the dangerous object penetrates into the protected field or exits the protected field.

Warning fields increase the availability because potential operators are prevented from infringing the protected field in good time. Many applications are known where the dangerous object comes into the field of vision of the scanner and where it exits it and these zones facilitate the object tracking or object recognition and the protected field adaptations. There is furthermore still the possibility that one or more simultaneously monitored protected fields differ in dependence on the configuration in whether a reset of the safety function is required which normally requires a special authorization or whether an automatic restart is possible.

In an advantageous further development of the invention, an arrangement of at least two safety scanners in accordance with the invention is provided, wherein the object information acquired from the received signals of the safety scanners can be converted into a common coordinate system in the evaluation unit of one of the safety scanners or in a higher ranking evaluation unit. The principle of laser scanners mean that they acquire no data in the shadow of objects. This also applies to zones which are shadowed by the dangerous object. A laser scanner practically without shadowing problems is created by combining the data of a plurality of laser scanners and the evaluation in a common coordinate system. Depending on the application, more than two laser scanners may also be required for this purpose.

The safety scanners of the arrangement preferably monitor the same scanning plane, in particular a horizontal scanning plane at the level of a transport platform or of its base. No problems thus occur in the recalculation into a common coordinate system.

Advantageously, a plurality of safety scanners are arranged at an intersection of a conveyor and a crossing, wherein the protected field is provided in a first protected field configuration at the entry location of the conveyor and at the exit location and leaves a free zone open for the crossing and the protected field secures the crossing in a second protected field configuration. In the first protected field configuration, operators can pass on foot or in a vehicle.

The protected field advantageously comprises in the second protected field configuration the total crossing or the protected field dynamically leaves the free zone behind the dangerous object increasingly open as the movement of the dangerous object progresses. In this situation, the conveyor moves objects over the intersection and the conveyor must therefore be stopped or secured in another manner on intrusions of operators. The protected fields preferably comprise the crossing and safety margins.

The dangerous object is preferably a conveyor element or an object moved by the conveyor, wherein the evaluation unit uses the first protected field configuration in the base state, switches over to the second protected field configuration when the dangerous object approaches the intersection and switches back to the first protected field configuration when the dangerous object has exited the intersection. Conveyor elements can be pallets, platforms, trays, hooks, driverless transport vehicles or the like which transport machine parts, automobiles or other objects.

The method in accordance with the invention can be further developed in a similar manner and shows similar advantages. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

Figure 1:
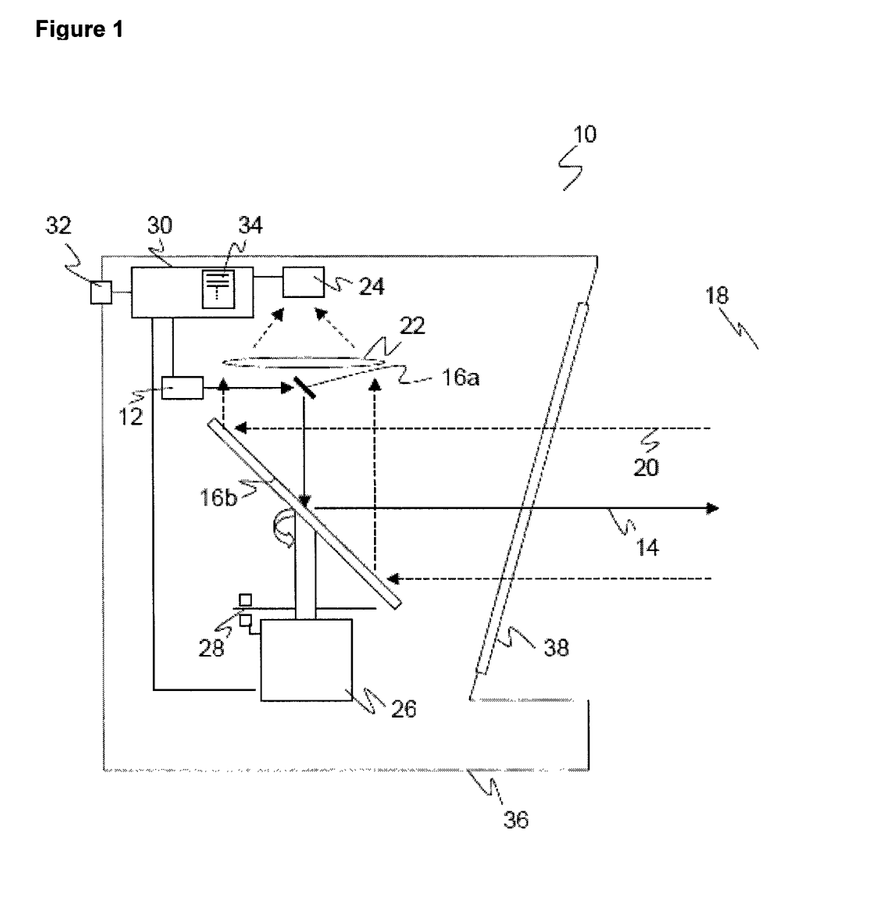
FIG. 1 a schematic sectional representation through a laser scanner in accordance with the invention.

FIG. 1 shows a schematic sectional representation through a safety scanner 10 in accordance with the invention. A light beam 14 which is generated by a light transmitter 12, for example by a laser, and which has individual light pulses, is directed into a monitored zone 18 via light deflection units 16*a-b* and is there remitted by an object which may be present. The remitting light 20 again arrives back at the safety scanner 10 again and is detected there by a light receiver 24, for example a photodiode, via the deflection unit 16*b* and by means of an optical receiving system 22.

The light deflection unit 16*b* is made as a rule as a rotating mirror which rotates continuously by the drive of a motor 26. The respective angular position of the light deflection unit 16*b* is detected via an encoder 28. The light beam 14 generated by the light transmitter 12 thus sweeps over the monitored zone 18 generated by the rotational movement. If a reflected light signal 20 received by the light receiver 24 is received from the monitored zone 18, a conclusion can be drawn on the angular position of the object in the monitored zone 18 from the angular position of the deflection unit 16*b* by means of the encoder 28.

In addition, the tight of flight of the individual laser light pulses is determined from their transmission up to their reception after reflection at the object in the monitored zone 18. A conclusion is drawn on the distance of the object from the safety scanner 10 from the time of flight of light while using the speed of light. This evaluation takes place in an evaluation unit 30 which is connected for this purpose to the light transmitter 12, to the light receiver 24, to the motor 26 and to the encoder 28. Two-dimensional polar coordinates of all objects in the monitored zone 18 are thus available via the angle and the distance.

The actual goal of the evaluation is to provide a safety signal at a safety output 12 (OSSD, output signal switching device), for example to trigger an emergency stop of a connected machine. For this purpose, the evaluation unit 30 calculates the location of an object in the monitored zone 18 via the angular data and the distance data. This is compared with a two-dimensional protected field whose geometry is stored by corresponding parameters in a memory 34 of the evaluation unit 30. The evaluation unit 39 thus recognizes whether the protected field is infringed, that is whether an unauthorized object is located therein and switches the safety output 32 in dependence on the result. It will be explained further below which intrusions are classified as authorized and which as not allowed. Depending on the embodiment, it is conceivable to carry out the evaluation or parts of the evaluation in a higher ranking controller instead of in an internal evaluation unit 30, as likewise described in the following. All the named functional components are arranged in a housing 36 which has a front screen 38 at the front side, that is in the region of the light exit and of the light entry. The front screen 38 is slanted to avoid direct reflections into the light receiver 24 so that the light beam 14 and the front screen 38 include an angle other than ninety degrees.

Figure 2A:
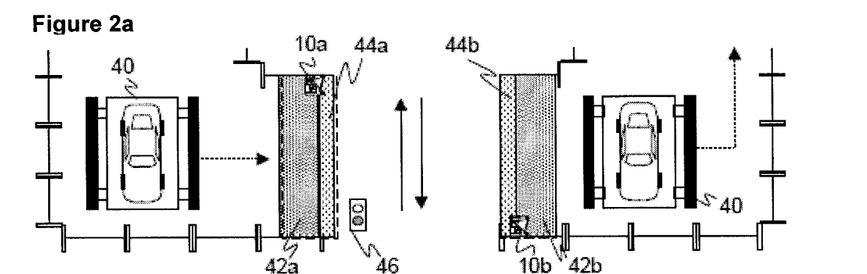
FIGS. 2*a-d* schematic plan views of the protected field and warning field configuration at the intersection of a conveyor system with a crossing in different stages of the movement of the conveyor.

FIG. 2*a* shows an arrangement of two safety scanners 10*a-b* disposed diagonally opposite at a danger zone where a vertically shown crossing for operators intersects with an automatic conveyor system moved horizontally in the representation. The scanning plane of the safety scanners 10*a-b* lie in an at least approximately joint horizontal plane at the level of platforms 40 of the conveyor system or at the level of their folding bars. The two safety scanners 10*a-b* are connected for joint evaluation to a higher ranking safe controller to which they securely transfer their data and which will be explained in more detail further below in connection with FIG. 4.

The safety scanners 10*a-b* in the starting situation shown in FIG. 2*a*, in which no platform 40 is present in the danger zone, use a respective protected field 42*a-b* which prevents operators from intruding into the zone of the conveyor system. A warning field 44*a-b* is positioned in front of the protected field 42*a-b* in each case. The intersection itself is free since there is no risk for operators at this time. The light 45 also indicates this by a green light, with a respective light being arranged at both sides of the intersection in practice or also with different display means also being able to be provided for operators, including mechanical barriers which would be open in this situation.

At a later time shown in FIG. 2*b*, the platform 40 has moved into an entry zone 48 of the intersection. The safety scanners 10*a-b* recognize the platform 40 at an object model which can also describe, in addition to the contour of the platform 40 or of the object located thereon, the entry location or the further movement pattern. In this case, it would, for example, be sufficient that the platform has penetrated into the protected field 42*a* of FIG. 2*a*, from the left in the representation. It is precluded that this is anything other than the platform 40 because the left hand zone is not accessible to persons. The more precise the object model is and the more parameters it includes, the clearer the association.

Figure 2B:
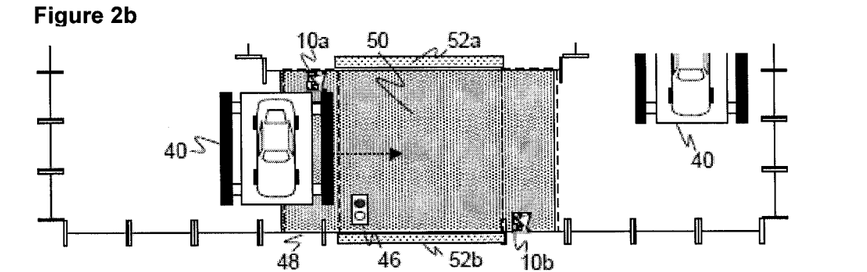

In the situation of FIG. 2*b*, the protected field configuration has been switched over due to the platform 40 recognized in the entry zone 48. A protected field 50 now protects the whole intersection and prevents persons from entering the intersection. The light is correspondingly switched to red. Warning fields 52*a-b* already prevent the approach to the intersection. The platform 40 is thus located in the protected field 50 and thus actually represents a protected field infringement. The known platform 40 is, however, taken into account in the evaluation and intrusions which can be associated with the platform 40 are not classified as critical to safety. Expressed differently, an environment of the platform 40 is effectively blocked out of the protected field 50.

This blocked out environmental region of the platform 40 migrates along with the platform 40 whose orientation, position and/or speed is known during the total relevant length of stay in the monitored zone 18 of the safety scanners 10*a-b* by object tracking. Due to the known position of the platform 40 in a preceding evaluation cycle, possibly still supported by the known planned movement or control data of the conveyor system, there is always a very reliable starting position for the search for the platform 40 in the scanner data. The object model of the platform 40, in particular its contour or the intersection of the 3D contour with the scanning plane is fit into the scanner data with these starting conditions, for example with known algorithms such as ICP (iterative closest point), simplified only with a bounding box or the like. Intrusions into the protected field which can in this respect reliably be associated with the platform 40 are not evaluated as critical to safety and do not result in any safety-directed switching off.

Figure 2C:
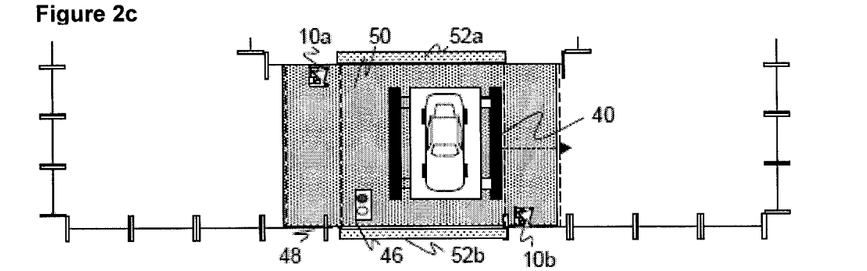
Figure 2D:
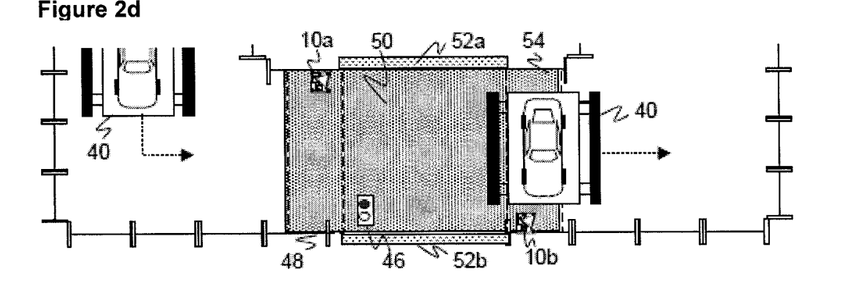

FIG. 2c shows a situation in which the platform 40 has almost reached the oppositely disposed end of the intersection. The protected field configuration in this respect remains unchanged in this embodiment and the light also continues to show red. In FIG. 2d, the platform 40 has moved into an entry zone 54, but has still not completely exited the intersection. The protected field 50 above the intersection is therefore still active and the light is red. As soon as the full width of the platform 40 has arrived in the exit zone 54 or, depending on the embodiment, also only when it has exited it again, the light is switched to green and the starting situation of FIG. 2a is restored.

Any intrusion into the protected field 50 which cannot be associated with the platform 40 has the result that the movement of the conveyor system and thus of the platform 40 is stopped. Depending on the point of entry and of exit of the protected field infringement, the conveyor system can automatically start again when the protected field is no longer infringed or can request the reset of the safety function by an operator. For example, infringements of the lateral protected fields 42a-b, that is a moving into the zone of the conveyor system and thus an exiting of the intersection, can require a manual reset; other infringements, in contrast, can allow an automatic restart. Additional exceptions are naturally also conceivable, for instance static objects on the intersection which can be taught in advance and can be ignored in operation.

FIG. 3 shows in a similar representation to FIG. 2 an embodiment of the invention which allows the safe rear crossing of the intersection behind the platforms 40 and thus a faster utilization of the crossing. FIGS. 3a and 3b correspond to FIGS. 2a-b with the difference that a further safety scanner 10c is arranged at a corner of the danger zone to acquire a sufficient amount of data despite shadowing.

During the movement of the platform 40 across the intersection, instead of a static protected field 50, a dynamic protected field 56a-b is used which is discretely or continuously adapted to the tracked movement of the platform 40. If the platform 40 has, as in FIG. 3c, already moved a little across the intersection, the now two-part protected field 56a-b leaves a free zone 58 in which persons can already safely enter the intersection again behind the platform 40.

Figure 3A:
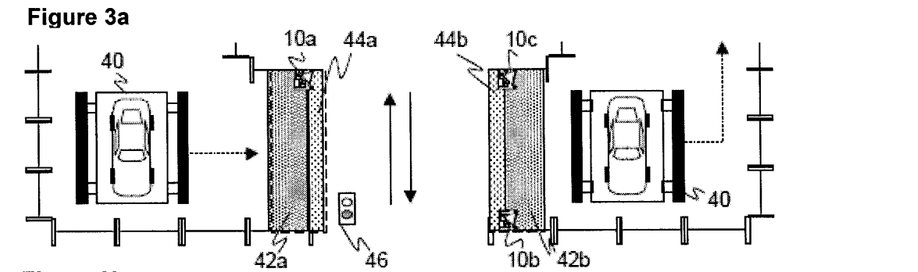
FIGS. 3*a-d* a representation in accordance with FIGS. 2*a-d* in an alternative protected field and warning field configuration.
Figure 3B:
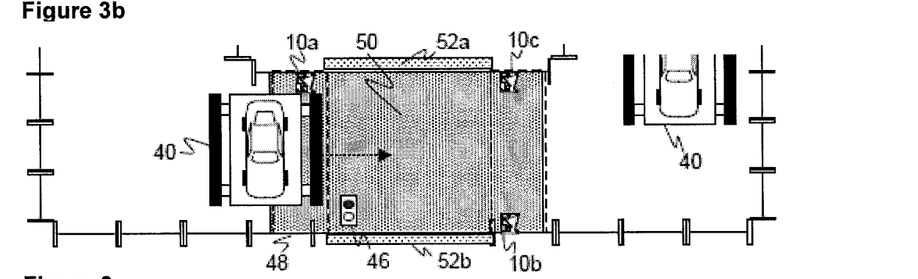
Figure 3C:
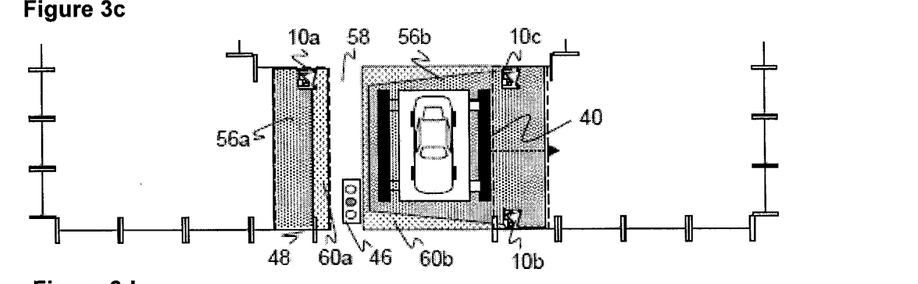

A static part 56a of the protected field 56a-b prevents the entry into the entry zone 48. Another dynamic part 56b of the protected field 56a-b is formed from a trapezoid, wherein two corners are determined by the positions of the mirror axes of the two safety scanners 10b-c. The two other corners of the trapezoid are determined so that the dangerous part of the platform 40 is completely surrounded, and preferably with safety margins. The then current object position and the stored object model of the object tracking of the platform 40 are used to determine these corners. The trapezoid is extended by a static rectangular portion which prevents entry into the exit zone 54. Warning fields 60a-b are also preferably situated before the protected fields 56a-b in this phase. The light is yellow to indicate that crossing is admittedly allowed, but attention must be paid to the platform 40.

Figure 3D:
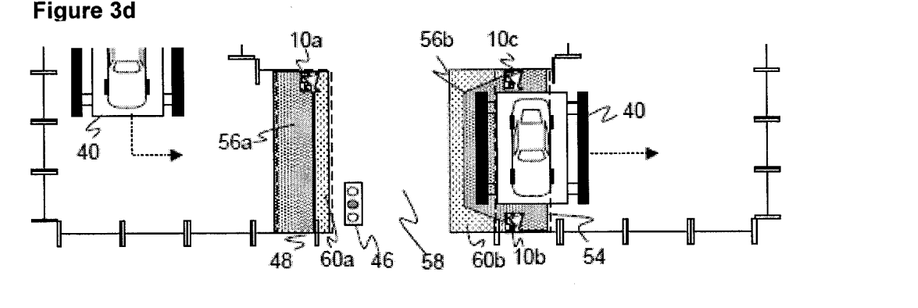

FIG. 3d shows the situation in which the platform 40 has already reached the exit zone 54. The free zone 58 already almost corresponds to the total intersection. As soon as the platform 40 has moved a little further again, the intersection is completely released and the starting situation of FIG. 3a is reached, wherein the protected field evaluation is again restored to the starting state and the light is switched to green.

Figure 4:
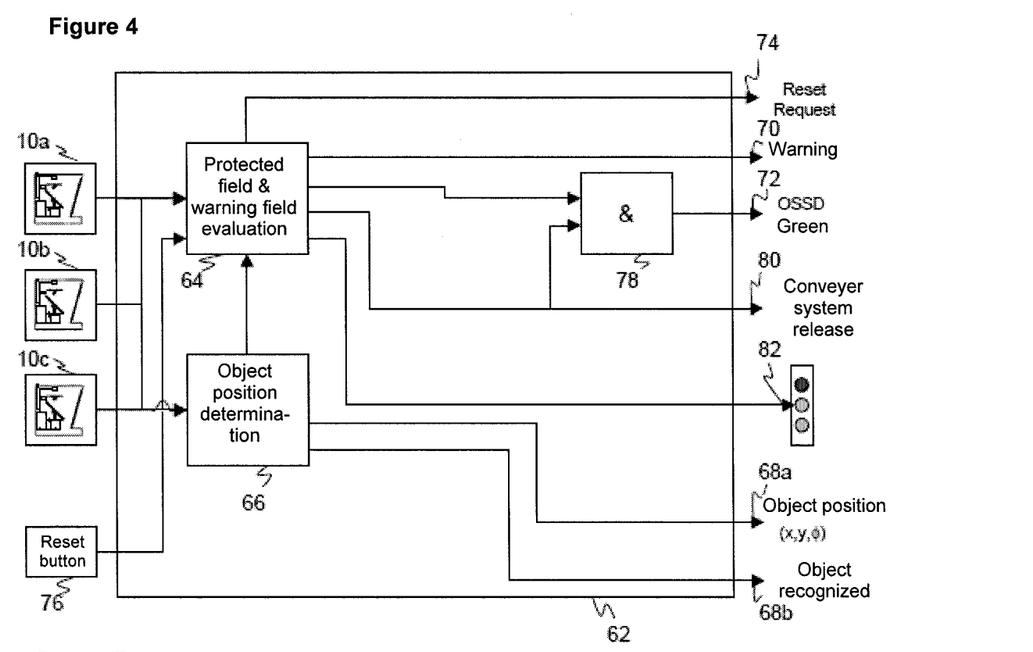
FIG. 4 a block diagram of a higher ranking controller for an embodiment of the invention with an arrangement of a plurality of laser scanners.

In FIG. 4, a block diagram of a higher ranking controller 62 for the evaluation of the data of the safety scanners 10a-c is shown. The safety scanners 10a-c deliver scan lines, that is ultimately distance profiles of the objects in their respective scanning plane, which are supplied to a protected field and warning field evaluation 64 and to an object position determination 66. For this purpose, the scan lines are first converted into a common coordinate system so that a complete scan image preferably arises without shadowing.

The determination of the object position of the platform 40 in the object position determination 66 starts as soon as a platform 40 was recognized in the entry zone 48. The object position of the platform 40, for example in the three parameters position (x, y) and orientation (j) is determined again with each new scan image of the safety scanners 10a-c and thus the platform 40 is tracked from the entry zone 48 across the intersection into the exit zone 54. As soon as the platform 40 has completely exited the monitored zone of the safety scanners 10a-c, the object tracking is ended and a new platform 40 is sought in the entry region 48.

The object position thus determined is, on the one hand, provided to outputs 68a-b of the safety controller for further processing, for instance for test and display purposes. On the other hand, the object position is transferred to the protected field and warning field evaluation 64. Measured points which can be associated with the platform 40 are blocked out there and a determination is made whether an object intrusion into a protected field or into a warning field is recognized after this blocking. On infringement of a warning field, a warning is sent to an output 70. This warning is not safety-critical and the output 7 is therefore a single channel.

The safety critical infringement of a protected field is transferred in a two-channel manner and output antivalently to the safety output 72. This safety output 72 is an OSSD which corresponds to the output 32 of the safety scanner 10 of FIG. 1 with only an internal evaluation unit 30. The switch-off signal is not applied directly to the safety output 72, but is offset with an internal reset function which can result in a reset request at an output 74. This reset function has the purpose that a qualified operator can restart the plant, for example after an emergency stop, by means of a reset button 76 after a personal assurance that the dangerous zones to the right and left of the intersection are free. Provision can additionally be made to offset the switch-off signal with the release of the conveyor system via an AND link.

The protected field and warning field evaluation 64 additionally controls a respective output 80 for the conveyor system to stop it and release it again in each case as well as one or more outputs 82 for the traffic light 46.

Figure 5:
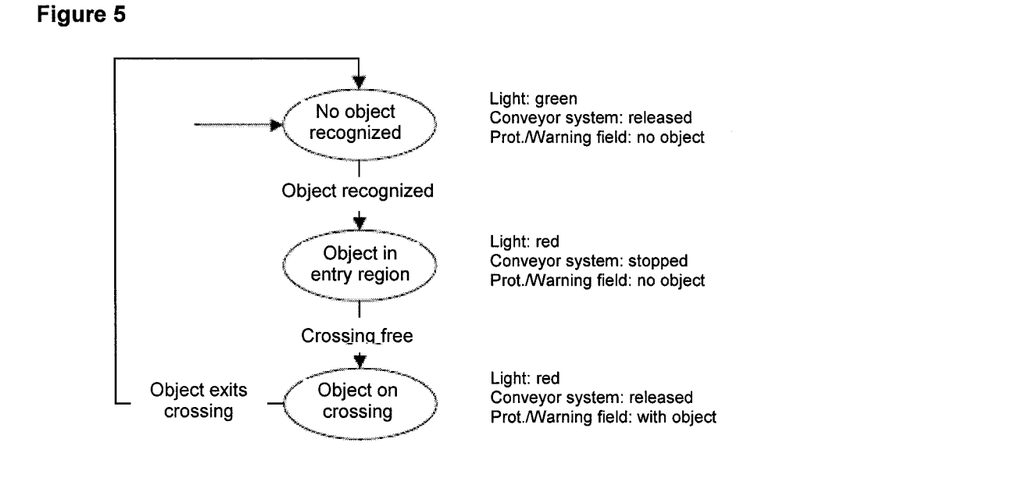
FIG. 5 a finite state machine for the protected field and warning field in the embodiment of the invention in accordance with FIG. 2.

FIG. 5 shows a finite state machine used internally in the protected field and warning field evaluation 64 for the embodiment shown in FIG. 2. In the starting state, which corresponds to FIG. 2a, the object position determination 66 has not recognized any platform 40. The intersection is therefore released for crossing and the light 46 is green. To prevent people from entering the dangerous zones to the right and left of the intersection, the two transfer zones 48, 54 are monitored by protected fields 42a-b and warning fields 44a-b.

If a platform 40 is recognized in this entry zone 48, the light 46 changes to red in accordance with a second state of the finite state machine and the conveyor system is prohibited from continued movement. The protected fields 42a-b and the warning fields 44a-b are maintained.

As soon as the safety scanners 10a-b thereupon do not recognize any foreign objects in their monitored zone 18, the conveyor system is released again in accordance with the third state of the finite state machine and a switchover is made to the protected field configuration in accordance with FIG. 2b. The protected field 50 covers the whole intersection and prohibits the crossing while the warning fields 52a-b protect against an unintentional emergency stop.

If the platform 40 then completely exits the intersection or the exit zone 54, the protected field evaluation is again reset to the starting state and the light changes to green.

Figure 6:
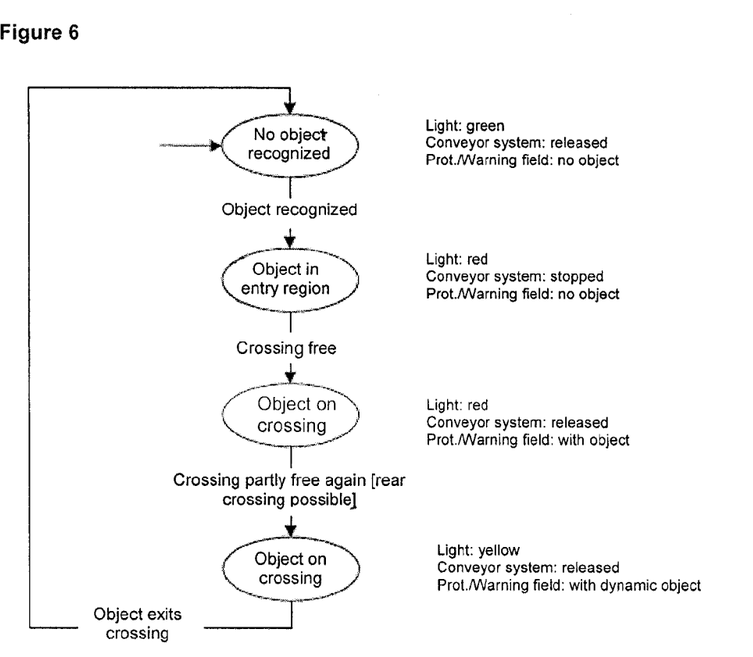
FIG. 6 a finite state machine for the protected field and warning field in one of the embodiments of the invention in accordance with FIG. 3.

FIG. 6 shows a modification of the finite state machine shown in FIG. 5 for the embodiment in accordance with FIG. 3 which allows a crossing of the intersection behind the platforms 40. The finite state machine differs by an additional fourth state which is changed into as soon as the platform 40 has partly released the intersection, for example has completely exited the entry zone 48 in order thus to use the dynamic protected fields 56a-b and the associated warning fields 60a-b in accordance with FIGS. 3c-d. In this state, the light changes to yellow and the protected fields 56a-b are dynamically reduced to allow rear crossing.

Parallel to the object tracking thus described and the switchover of the protected field configuration, a monitoring always takes place for unauthorized object intrusions and the safety function is optionally triggered.

The invention thus also comprises, in addition to the evaluation in a single safety scanner 10, a joint evaluation in which the measured distance values of at least two safety scanners are not directly evaluated, but are first converted into a common coordinate system. Subsequently, all the scanned points are discarded which lie outside the defined protected field and are no longer taken into account in the following evaluation steps.

The measured scanned points which lie within the protected field, then do not necessarily result in a protected field infringement. Instead, each scanned point is classified as to whether it belongs to a known object, for example a platform 40, or not. In this respect, the use at a conveyor system is only to be understood as an example; the invention also includes embodiments with other tracked objects for example, vehicles, pallets or movements or robots as a whole or of robot arms.

As preparation for the classification, the model of the known object extent is virtually placed onto the then current object position. If a scanned point to be classified is in the proximity of the then current model silhouette, it is classified as an object point. If the scanned point is, however, further remote from the model outlines than a specific maximum distance, for example, it is classified as a foreign object point.

Even a foreign object point still does not yet directly represent a protected field infringement if, for example, it is too small or only temporary and if a disturbance such as an insect, a raindrop, dust or the like could be the cause. Apart from such disturbance suppression, there is, however, a protected field infringement as soon as a foreign object point is measured. A safety-directed switching off takes place. If, however, only scanned points are measured which are classified as object points, these scanned points are blocked out and the protected field is not infringed.

The invention claimed is:

1. A safety scanner (10) for securing a monitored zone (18), wherein the safety scanner (10) has a light transmitter (12) for transmitting a light beam (14), a deflection unit (16) for the periodic deflection of the light beam (14) into the monitored zone (18), a light receiver (24) for generating received signals from the light beam (20) remitted by objects in the monitored zone (18) as well as an evaluation unit (30) which is made to recognize intrusions into a protected field within the monitored zone (18) with reference to the received signals and thereupon to provide a securing signal, except for the case that the intrusion can be associated with an expected object (40), characterized in that the evaluation unit (30) is made to track or to recognize the object (40) in the protected field and to carry out the association of intrusions with the expected object (40) with reference to the contour and to the then current position, orientation and/or speed of the object (40)

wherein the evaluation unit (30) is made to switch over between a plurality of protected field configurations which each fix the boundaries of the protected field within the monitored zone (18) and is made to carry out said switchover of the protected field configuration when the object (40) enters into the protected field and/or exits the protective field, wherein in particular the protected field configuration is the same before the entry and after the exit of the object (40).

2. A safety scanner (10) in accordance with claim 1, wherein the evaluation unit (30) is made to dynamically adapt the protected field during the movement of the object (40) in the protected field, in particular such that the object (40) is always surrounded in all directions by a protected field ensuring safety.

3. A safety scanner (10) in accordance with claim 1, wherein the evaluation unit (30) is made to dynamically reduce the protected field in size in a counter-direction to the direction of movement of the object (40).

4. A safety scanner (10) in accordance with claim 1, wherein the evaluation unit (30) is made to recognize the object (40) in the protected field with reference to the contour, to the trajectory within the protected field and/or to the location of the penetration or exiting of the protected field.

5. A safety scanner (10) in accordance with claim 1, wherein the evaluation unit (30) is made to provide at least one of the following part zones in the monitored zone (18):
    a warning field which is situated before the protected field and in which a warning takes place first before a securing;
    a free zone in which all intrusions are allowed; and/or
    an entry zone and an exit zone in which the object penetrates into the protected field or exits the protected field.

6. A safety scanner (10) for securing a monitored zone (18), wherein the safety scanner (10) has a light transmitter (12) for transmitting a light beam (14), a deflection unit (16) for the periodic deflection of the light beam (14) into the monitored zone (18), a light receiver (24) for generating received signals from the light beam (20) remitted by objects in the monitored zone (18) as well as an evaluation unit (30) which is made to recognize intrusions into a protected field within the monitored zone (18) with reference to the received signals and thereupon to provide a securing signal, except for the case that the intrusion can be associated with an expected object (40), characterized in that the evaluation unit (30) is made to track or to recognize the object (40) in the protected field and to carry out the association of intrusions with the expected object (40) with reference to the contour and to the then current position, orientation and/or speed of the object (40), and the said safety scanner (10) is in combination with a further safety scanner (10b-c) at an intersection of a conveyor and of a crossing, wherein, in the evaluation unit (30) of one of the safety scanners (10a-c) or in a higher-ranking evaluation unit (62 64, 66), the object information acquired from the received signals of the safety scanners (10*a-c*) can be recalculated into a common coordinate system, and wherein, in a first protected field configuration, the protected field (42*a-b*) is provided at the entry location (48) and at the exit location (54) of the conveyor and leaves a free zone open for the crossing and, in a second protected field configuration, the protected field (50) secures the crossing.

7. A safety scanner combination in accordance with claim 6, wherein the safety scanners (10*a-c*) monitor the same scanning plane, in particular a horizontal scanning plane at the level of a transport platform (40) or of its base.

8. A safety scanner combination in accordance with claim 6, wherein, in the second protected field configuration, the protected field (50) comprises the total crossing; or wherein the protected field (56) dynamically leaves the free zone (58) behind the object (40) increasingly open again as the movement of the object (40) progresses.

9. A safety scanner combination in accordance with claim 6, wherein the object is a conveyor element (40) or an object moved by the conveyor; and wherein the evaluation unit (30, 62, 64, 66) uses the first protected field configuration in the base state, switches over to the second protected field configuration when the object (40) approaches the intersection and switches back over to the first protected field configuration when the object (40) has exited the intersection.

10. A method for securing a monitored zone (18), wherein intrusions into a protected field within the monitored zone (18) are recognized by means of at least one safety scanner (10) and a securing signal is thereupon provided, except for the case that the intrusion can be associated with an expected object (40), characterized in that the object (40) is tracked or recognized in the protected field and the association of intrusions to the expected object (40) takes place with reference to the contour and to the then current position, orientation and/or speed of the object (40), and wherein the protected field (56) is dynamically adapted during the movement of the object (40) in the protected field (56), in particular such that the object (40) is always surrounded in all directions by a protected field (56) ensuring safety;

or wherein the protected field (56) is dynamically reduced in size in a counter-direction to the direction of movement of the object (40);

and/or wherein a switchover is made between a plurality of protected field configurations which each fix the boundaries of the protected field within the monitored zone (18), with a respective switchover in particular taking place when the object (40) enters into the protected field (40) and/or exits the protected field.

11. A method for securing a monitored zone (18), wherein intrusions into a protected field within the monitored zone (18) are recognized by means of at least one safety scanner (10) and a securing signal is thereupon provided, except for the case that the intrusion can be associated with an expected object (40), characterized in that the object (40) is tracked or recognized in the protected field and the association of intrusions to the expected object (40) takes place with reference to the contour and to the then current position, orientation and/or speed of the object (40), wherein a plurality of safety scanners (10*a-c*) are arranged at an intersection of a conveyor and of a crossing; wherein, in a first protected field configuration, the protected field (42) is provided at the entry location and at the exit location of the conveyor and leaves a free zone open for the crossing and, in a second configuration, the protected field (50, 56) secures the crossing in that the protected field (50) comprises the total crossing or the protected field dynamically leaves the free zone (38) behind the object open again as the movement of the object (40) progresses;

wherein the object is in particular a conveyor element (40) or an object moved by the conveyor, and a switchover is made from a base state having the first protected field configuration to the second protected field configuration when the object (40) approaches the intersection and a switchover back to the first protected field configuration is made when the object (40) has exited the intersection.

* * * * *